E. TYDEN.
SEAL FOR SEAL LOCKS.
APPLICATION FILED MAR. 5, 1913.
1,080,184.
Patented Dec. 2, 1913.
Fig. 1.
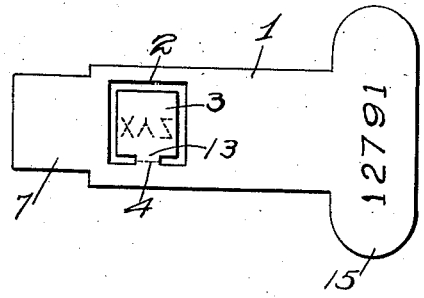
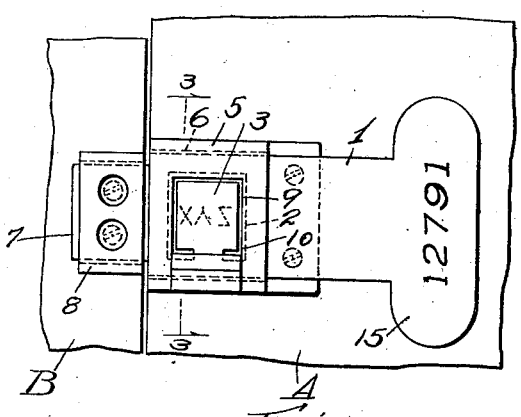
Fig. 2.
Fig. 3.
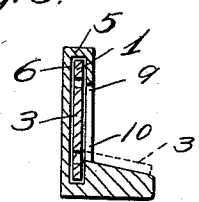
Fig. 4.
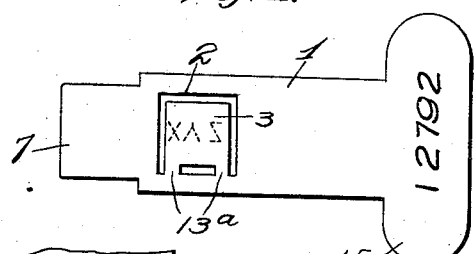
Fig. 5.
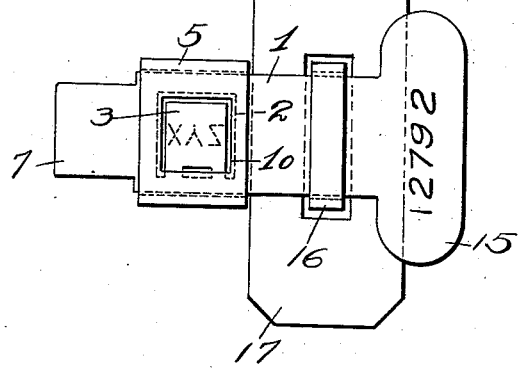
Witnesses:
Inventor
Emil Tyden.
by Burton & Burton
his Atty's.

UNITED STATES PATENT OFFICE.

EMIL TYDEN, OF HASTINGS, MICHIGAN.

SEAL FOR SEAL-LOCKS.

1,080,184.  Specification of Letters Patent.  Patented Dec. 2, 1913.

Application filed March 5, 1913. Serial No. 751,986.

*To all whom it may concern:*

Be it known that I, EMIL TYDEN, a citizen of the United States, residing at Hastings, in the county of Barry and State of Michigan, have invented new and useful Improvements in Seals for Seal-Locks, of which the following is a specification, reference being had to the accompanying drawings, forming a part thereof.
The purpose of this invention is to provide an improved form of seal for seal locks.

It consists of the elements and features of construction shown and described as indicated in the claims.

In the drawings: Figure 1 is a plan view of a flat metal or plate seal embodying this invention. Fig. 2 is a front elevation of a simple form of lock employing such seal, showing the latter in locking and sealing position. Fig. 3 is a section at the line 3,—3, on Fig. 2. Fig. 4 is a plan view of a modified form of the seal. Fig. 5 is a front elevation showing the seal applied to a hasp and staple fastening device.

The seal which constitutes this invention is a piece of sheet material, preferably metal, and preferably of sufficient thickness so that, while it is flexible enough to be bent or folded with the fingers in narrow widths, it is liable to break at the bending or folding line upon being bent back to original form. This plate or strip, 1, has intermediate its ends an aperture, 2, from one margin of which there is formed projecting into the aperture a tongue, 3, which is connected with the margin of the aperture from which it projects at a line, 4, at which it may be folded or bent out of the plane of the plate, 1, so as to extend transverse to that plate. The character of the metal and the dimensions of a section at the line, 4, are such that the tongue will break off at that line upon being straightened back into the plane of the plate, 1. This seal may be used in a variety of ways, and one or another of the features described and to be described may be dispensed with according to the mode of use, though all may be present, thereby adapting the seal to be used in one way or another,—that is, with one sort of a lock or another, as occasion may require. In Fig. 2 there is shown a simple form of locking device suitable for using this seal, comprising a housing, 5, mounted upon the member, A,—one of the two members to be locked together by the device,—said housing having at 6 a slide path for the seal which is adapted to be thrust entirely through said housing so that the end, 7, may protrude into a socket, 8, mounted upon the member, B, which is to be secured to the member, A, by the device. At the position of the seal at which the end, 7, is engaged in the socket, 8, the tongue, 3, stands exposed in an aperture, 9, of the housing which extends entirely through the latter transversely of the slideway, 6, so that the tongue may be bent out through that aperture so as to stand cross-wise of the edge, 10, and protrude out from the housing, as seen in Fig. 3. In this position it will be seen that the seal, 1, which is also a bolt, cannot be withdrawn from the housing, 8, until the tongue, 3, is either broken off or bent back into the plane of the slideway, 6; and, as indicated, the proportions and character of the material of said seal are such that upon being thus bent back into said plane, the tongue will break off, and if this is done by an unauthorized person, the fact that the lock has been tampered with will be discovered by the absence of the tongue. Said tongue is preferably made large enough to receive an identifying mark, as indicated by the mark, X Y Z shown in the drawings.

Preferably, the tongue is reduced in width to a neck or necks at the line of its juncture with the body of the seal, as shown in the drawings, and this may be done so as to leave a single neck, 13, as shown in Fig. 1, or a plurality of necks, 13ª, as shown in Fig. 4. It will be seen that while the two necks will afford greater strength or stiffness tending to prevent accidental bending of the seal out of its normal plane, the two necks will break just as easily as one neck will break when the seal is actually bent, and on this account the form having a plurality of necks, each narrow, is somewhat to be preferred to the form having a single neck, either as small or as narrow as each of the necks of the other form or equal to the sum of them, because if it is as narrow as each of the necks of the other form, it will be more easily bent out of position, and if it is as wide as both of them together, it will be less certain to break.

The seal is shown widened at one end to form a head, 15. This adapts it to be used in a manner shown in Fig. 5 where it is shown employed as a bolt inserted through a staple, 16, to secure a hasp, 17.

An especial advantage of forming the bendable and breakable member of the seal as a tongue standing within an aperture in the seal body is that said tongue is thereby protected from breaking in shipment and handling of the seals before use.

I claim:—

1. A sheet metal seal for seal locks having intermediate its ends an aperture and a tongue projecting from one margin of the aperture thereinto, the metal of the seal being adapted to permit the bending of the tongue into position transverse of the plane of the seal, but to break upon being straightened back into said plane.

2. A sheet metal seal for seal locks having opposite parallel edges for guidance in sliding, and being cut away at a portion of its length intermediate the parallel lines of said edges, such seal having a tongue standing in the cut-away area and adapted to be bent transversely to the plane of the seal, but to break upon being straightened back into that plane.

3. A sheet metal seal for seal locks having a tongue which stands normally in the plane of the seal, and which is weakened at a line transverse to the direction in which the tongue projects from the seal body for easily bending to a position transverse to the plane of the seal and breaking upon being straightened back into that plane.

4. A sheet metal seal for seal locks having intermediate its ends an aperture, and a tongue projecting from the margin of the aperture at one side thereof, said tongue being narrower than the aperture at that side and shorter than the transverse dimension of the aperture, whereby it is adapted to be bent transversely to the plane of the seal at the margin of said aperture from which it protrudes thereinto, the metal being adapted to break upon the tongue being straightened back into the plane of the seal.

5. A sheet metal seal for seal locks having a tongue which stands normally in the plane of the seal and which is of considerable width for receiving an identifying mark, the tongue being reduced in width at its junction with the body of the seal, whereby it is adapted to be bent at said reduced junction into position transverse to the plane of the seal and to break upon being straightened back into said plane.

6. A sheet metal seal having a tongue projecting in the plane of the seal, the edges which extend in the direction in which the tongue as a whole projects making angular junction with the edge from which it thus projects, whereby the adaptation of the tongue to break when bent at its root or junction with the seal body transversely to the plane of the seal and afterward straightened back toward its original position, is increased.

7. A seal for seal locks, having intermediate its ends an aperture and a tongue projecting from one margin of the aperture thereinto, the tongue being adapted to be bent into position transverse to the plane of the seal, the seal and tongue being of sheet metal so thick relatively that the tongue is adapted to break off from the body of the seal upon being straightened back into the plane of the seal.

8. A seal for seal locks in the form of a plate having opposite parallel edges for guidance in sliding, and being cut away at a portion of its length intermediate the parallel lines of said edges, said seal having a tongue standing in the cut away area, and adapted to be bent transversely to the plane of the plate, said plate being of metal of such relative thickness that the tongue is adapted to break off from the body of the plate upon being straightened back into the plane thereof.

9. A seal for seal locks in the form of a plate having a tongue which stands normally in the plane of the plate, and which is adapted to be bent from said normal position into a position transverse to said plane, the metal of the plate being weakened at a line transverse to the direction in which the tongue projects from the body, and being of such character and relative thickness as to be broken at said weakened line upon being straightened back into the plane of the plate.

In testimony whereof, I have hereunto set my hand, at Chicago, Illinois, this 24th day of February, 1913.

EMIL TYDEN.

Witnesses:
 LUCY I. STONE,
 EDNA M. MACINTOSH.